(12) United States Patent
Johnson et al.

(10) Patent No.: US 8,882,896 B2
(45) Date of Patent: Nov. 11, 2014

(54) MULTI-DIRECTIONAL OUTLET TRANSITION AND HOOD

(75) Inventors: Dennis W. Johnson, Simpsonville, SC (US); Jonathan Priest, Charlotte, NC (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 219 days.

(21) Appl. No.: 13/309,923

(22) Filed: Dec. 2, 2011

(65) Prior Publication Data

US 2013/0139696 A1    Jun. 6, 2013

(51) Int. Cl.
*F23J 15/00* (2006.01)
*F23J 11/00* (2006.01)

(52) U.S. Cl.
USPC ........... 96/243; 95/149; 95/235; 95/236; 95/228

(58) Field of Classification Search
None
See application file for complete search history.

(56) References Cited

U.S. PATENT DOCUMENTS

| | | | |
|---|---|---|---|
| 4,249,916 A * | 2/1981 | Dick et al. | 95/96 |
| 5,648,048 A | 7/1997 | Kuroda et al. | |
| 6,846,463 B1 * | 1/2005 | Dries et al. | 422/147 |
| 6,938,780 B2 * | 9/2005 | Baglione et al. | 209/717 |
| 7,850,936 B2 * | 12/2010 | Levasseur et al. | 423/244.01 |
| 7,867,322 B2 * | 1/2011 | Gal | 95/199 |
| 8,414,852 B1 * | 4/2013 | Johnson et al. | 423/228 |
| 8,435,330 B2 * | 5/2013 | Bade et al. | 95/199 |
| 2008/0175777 A1 * | 7/2008 | Suchak et al. | 423/239.1 |
| 2008/0253949 A1 * | 10/2008 | Ripperger | 423/244.1 |
| 2009/0148371 A1 * | 6/2009 | Reddy et al. | 423/235 |
| 2011/0033359 A1 * | 2/2011 | Papenheim et al. | 423/235 |
| 2011/0113957 A1 * | 5/2011 | Sceats | 95/15 |

OTHER PUBLICATIONS

Citing the definition of "upper" as found in the Free Online Dictionary. www.thefreedictionary.com/upper (Mar. 17, 2014).*

* cited by examiner

*Primary Examiner* — Duane Smith
*Assistant Examiner* — Pankti Patel
(74) *Attorney, Agent, or Firm* — Fish & Tsang, LLP

(57) ABSTRACT

Post-combustion conditioning systems are described that include a flue gas conditioning device configured to condition an exhaust stream to produce a conditioned stream. First and second outlet ducts can be fluidly coupled to, and substantially supported by, the flue gas conditioning device. This advantageously can eliminate costly ductwork, reduce the space required, and reduce the pressure drop of the system. The first outlet duct can fluidly couple the flue gas conditioning device to an exhaust duct, such that the conditioned stream can flow from the first conditioning device via the first outlet duct.

20 Claims, 5 Drawing Sheets

MULTI-DIRECTIONAL OUTLET TRANSITION AND HOOD

FIELD OF THE INVENTION

The field of the invention is post-combustion conditioning systems and methods.

BACKGROUND

A typical flue gas desulfurization (FGD) system 100 is shown in FIGS. 1A-1B. The system 100 includes a FGD unit 102 that uses an upward flow (fluegas) and a spray or tray tower with a centering outlet cone 110 and a single discharge hood 120. The fluegas exits the FGD unit 102 through a centered outlet 110 and flows past a 90 degree bend 112 and hood 120 before flowing through an expansion joint 130 and entering the stack 140. Steel supports 150 are used to support the discharge hood 120, and are also used to support optional $CO_2$ capture systems (not shown) disposed downstream of the FGD unit 102.

U.S. Pat. No. 5,648,048 to Kuroda, et al. discusses another example of a FGD unit having a single outlet duct supported by a circulation tank disposed beneath the outlet duct. However, in Kuroda and all prior art devices known to Applicants, FGD units with multiple outlets require separate structural support 150 apart from the FGD unit 102 to support the outlets, which is expensive, takes up a lot of space, and adds pressure drop. Kuroda and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIG. 2 illustrates another embodiment of a prior art FGD system 200 having two $CO_2$ capture systems 240 disposed downstream of a FGD unit 202. The addition of the $CO_2$ capture systems 240 adds complexity to the system 200 since the gas exits the top of the FGD unit 202, and is directed through a centering cone 204 to ductwork 210 that connects to the stack 230 and has additional ductwork 220A and 220B and dampers 222A and 222B that allow the gas to flow to the $CO_2$ capture systems 240. Ductwork 210 can also include a damper 212, which adds further weight to system 200. The ductwork 210, damper 212, and $CO_2$ capture systems 240 require separate structural support (not shown) to support these components.

Thus, there is still a need for post-combustion conditioning systems having outlet ducts that are substantially supported by a flue gas conditioning device.

SUMMARY OF THE INVENTION

The inventive subject matter provides apparatus, systems and methods for post-combustion conditioning systems, which include a flue gas conditioning device configured to condition an exhaust stream to produce a conditioned stream. Such systems could be used for applications in power, pulp and paper, mining, refining, steel and other industries. The inventive subject matter advantageously utilizes less duct material quantity, and related components, to divide the treated flue gas flow with the "multi-directional" outlet transition hood than it would be required with a single outlet transition hood, followed by ductwork with a flow splitting configuration.

Preferred conditioning systems can further include at least two outlet ducts, each of which is fluidly coupled to, and substantially supported by, the flue gas conditioning device. As used herein, the term "substantially supported" means a significant amount of the weight is supported. For example, outlet ducts substantially supported by the first flue gas conditioning device means that the flue gas conditioning device supports a significant amount of the weight of each of the outlet ducts. Thus, contrary to prior art systems that require a separate steel structure to support the outlet ducts, especially where the outlet duct includes a damper, the inventive subject matter discussed herein advantageously eliminates the need for such separate supporting structures by utilizing the flue gas conditioning device to support a significant amount of the weight of the outlet ducts.

At least one of the outlet ducts can be fluidly coupled to an exhaust duct, such that the conditioned stream can flow from the first conditioning device to the exhaust duct via at least one of the outlet ducts.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including eliminating costly ductwork, reducing the space required, and reducing the pressure drop of the system. It is contemplated that the inventive subject matter can be applied to coal- or oil-fired power plants and any other processes that include a post-combustion $CO_2$ capture process downstream of a gas treatment system.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
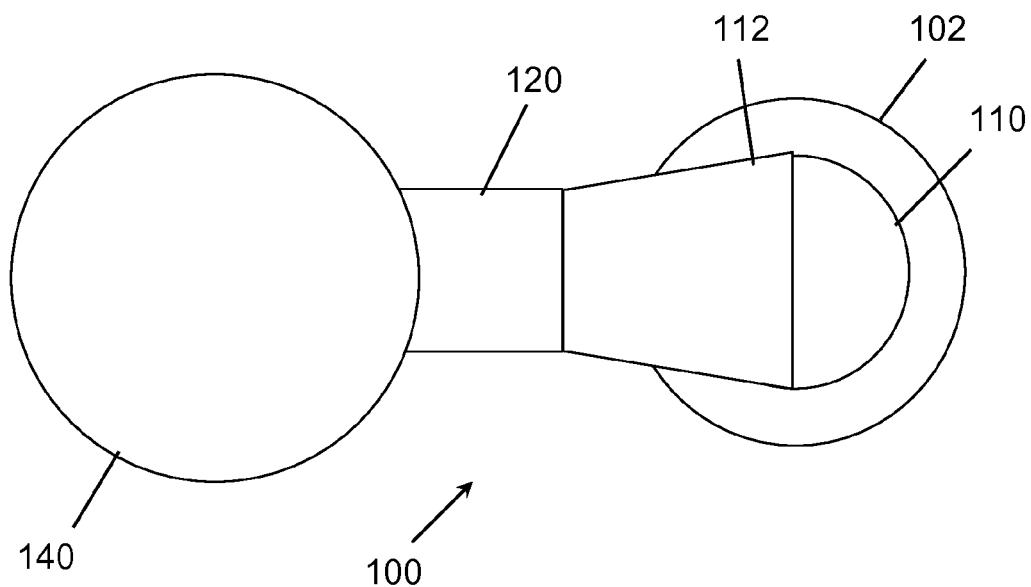
FIGS. 1A-1B are top and side views of a prior art flue gas conditioning system.
Figure 1B:
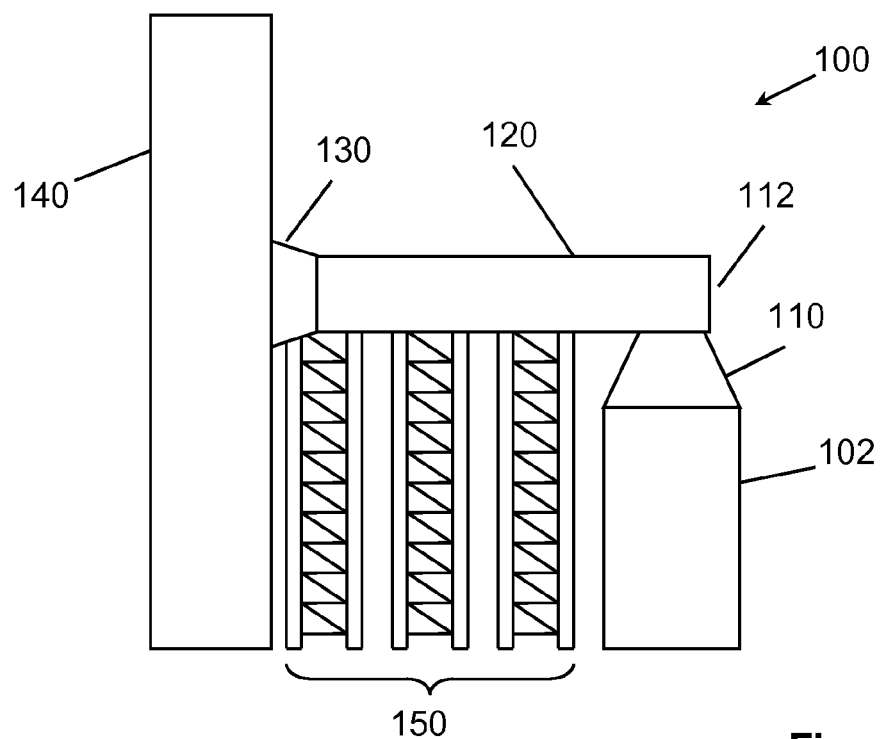
Figure 2:
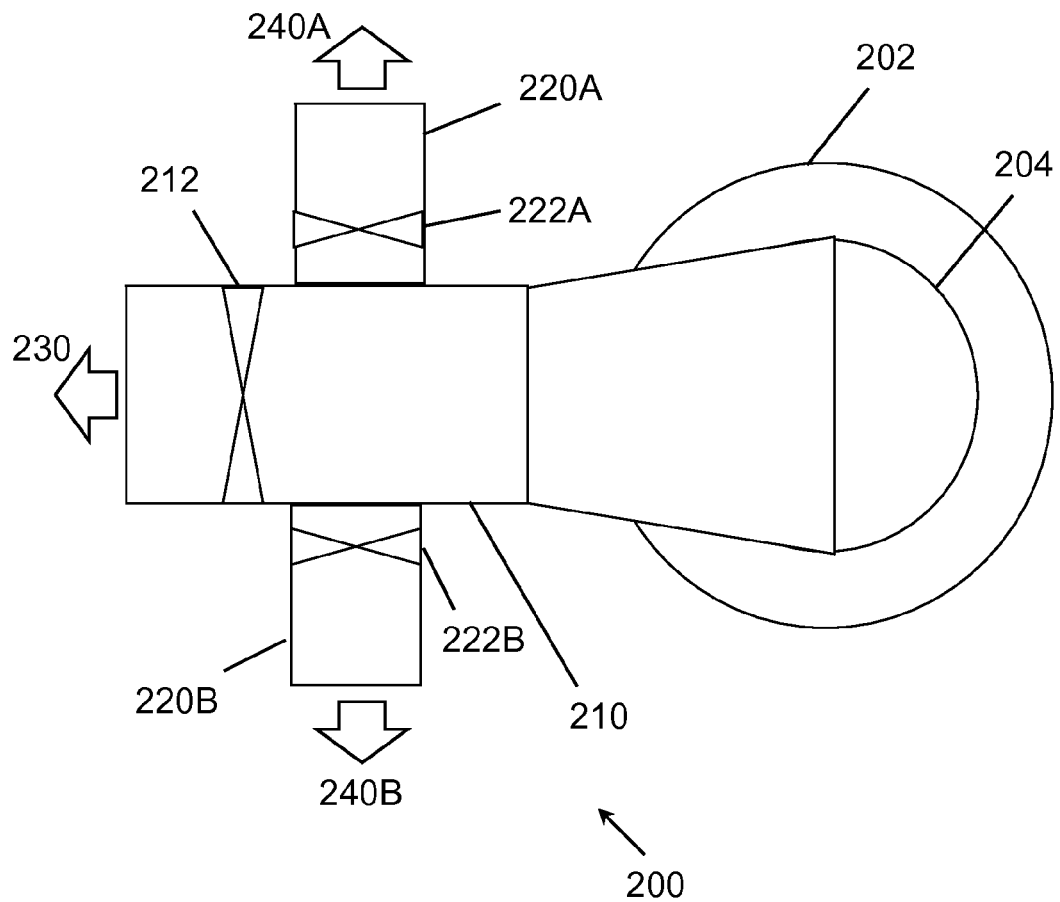
FIG. 2 is a top view of a prior art flue gas conditioning system having multiple ducts.
Figure 3:
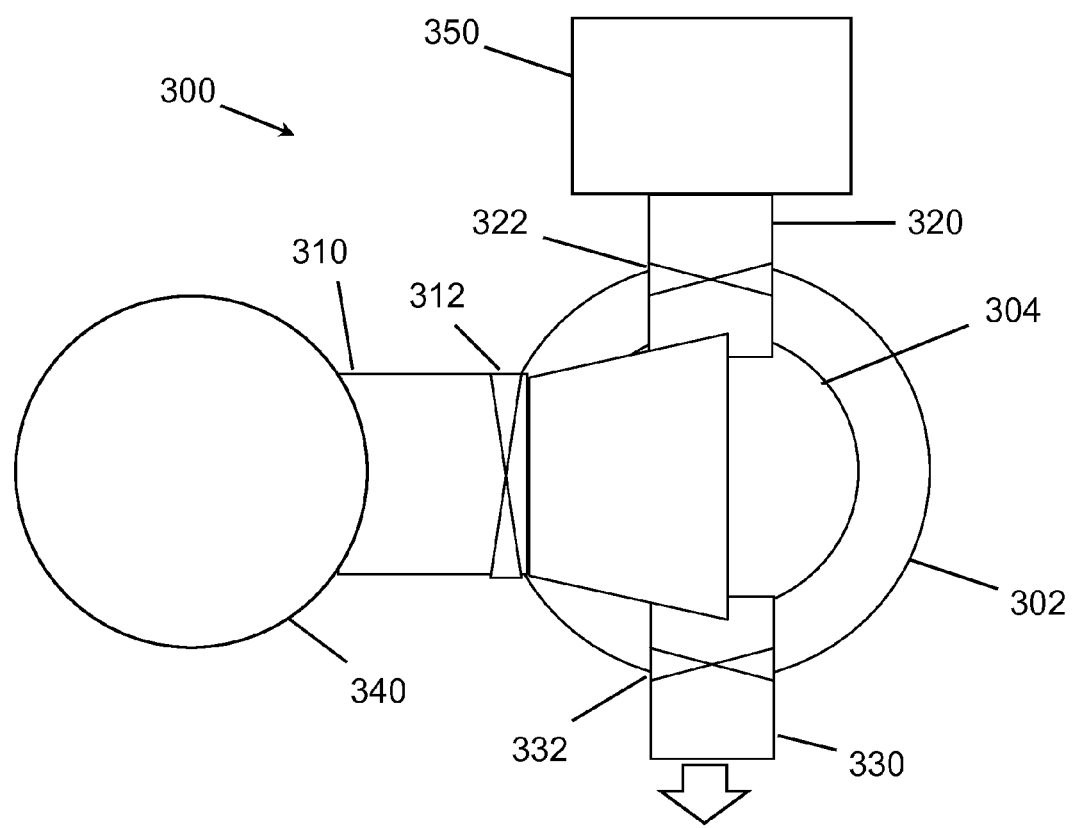
FIGS. 3-6 are top views of various embodiments of post-combustion conditioning systems having multiple outlet ducts.

In FIG. 3, a post-combustion conditioning system 300 is shown having first, second, and third outlet ducts 310, 320, and 330, respectively, which are each substantially supported by, and fluidly coupled to, an upstream first flue gas conditioning device 302. Each of the outlet ducts 310, 320, and 330 could have a rectangular, circular, ovular, or any other commercially suitable cross-section or combination(s) thereof.

Preferably, at least 60% of the weight of the outlet ducts and their components (e.g., dampers) is supported by the first flue gas conditioning device 302, and more preferably, at least 70%, 80%, 85%, and even 90% of the weight of the outlet ducts and their components is supported by the first flue gas conditioning device 302.

Contemplated systems can include any post-combustion $CO_2$ capture process such as Econamine FG Plus$^{SM}$, which follows a scrubbing system such as a FGD system and requires a bypass or other path to exhaust the gases. This could apply to slip-stream processes where not all of the fluegas from the FGD unit is sent to downstream processes, and could also apply to processes having a split flow from a single process vessel to multiple locations, multiple vessels, multiple process steps, or N-way (N>1) flow paths from the single process vessel. This could further be applied to processes other than $CO_2$ capture, which require a split flow of gas from a process vessel, reactor, or tower, such as splitting the flow to two existing small stack breachings from a single hood.

The first flue gas conditioning device 302 can include a centering cone 304 that preferably couples device 302 with at least one of outlet ducts 310, 320, and 330. Contemplated flue gas conditioning devices can have a circular or rectangular cross-section, although it is contemplated that the flue gas conditioning devices could have any commercially suitable configuration. The first flue gas conditioning device 302 preferably comprises a FGD unit, although other commercially suitable scrubbers or gas conditioning devices could be used including, for example, a caustic scrubber such as used for removal of $H_2S$, a chloride scrubber, and a direct contact cooler (DCC). An exhaust stream can be received by the first flue gas conditioning device 302, which is configured to condition the exhaust stream to produce a conditioned stream. In embodiments where the first gas conditioning device 302 is a FGD unit, the conditioned stream is preferably substantially depleted of $SO_x$.

At least a portion of the conditioned stream can flow through the first outlet duct 310, which is coupled to an exhaust duct 340, such that some or all of the conditioned stream can be exhausted from system 300.

By utilizing multi-directional ducts 310, 320, and 330 that are each substantially supported by the first flue gas conditioning device 302, the system 300 advantageously provides significant savings in expensive ductwork, structural supports, foundations, engineering, access provisions, and expansion joints, reduces the space required for the system and allows the FGD to be located closer to the stack, improves maintenance access since the dampers are located just above the FGD unit, simplifies retrofit installation on existing FGD units where space between the FGD unit and stack may not allow easy ductwork modifications, and provides for a notable reduction in the pressure drop.

In some contemplated embodiments, the second outlet duct 320 can be coupled to a second flue gas conditioning device 350. In such embodiments, at least a portion of the conditioned stream preferably exits the first flue gas conditioning device 302 and flows through the second outlet 320 to the second flue gas conditioning device 350, where the stream can be further conditioned, such as to further reduce pollutants in the portion of the conditioned stream received. The second flue gas conditioning device 350 can comprise any commercially suitable gas conditioning device including, for example, a $CO_2$ capture device, a DCC, a second FGD unit, and any combination(s) thereof.

The third outlet duct 330 can be fluidly coupled to a flue gas conditioning device or other system, depending upon the local regulations and composition of the flue gas. In some contemplated embodiments, the third outlet duct 330 can receive a portion of the conditioned stream and be fluidly coupled to a $CO_2$ capture device, a DCC, a FGD unit, or other commercially suitable conditioning device.

Each of the first, second, and third outlet ducts 310, 320 and 330 can include a damper 312, 322, and 332, respectively, which are each preferably substantially supported by the first flue gas conditioning device 302. Dampers 312, 322, and 332 can advantageously be used to regulate or direct flow within the first, second, and third outlet ducts 310, 320 and 330, respectively. Because the dampers 312, 322, and 332 and outlet ducts 310, 320 and 330 are each substantially supported by the first flue gas conditioning device 302, system 300 eliminates the need for separate structural supports, which thereby reduces the cost, space required, and complexity of the system 300.

In alternative embodiments, it is contemplated that one or more of the dampers 312, 322, and 332 could be eliminated depending on the specific application.

Although three outlet ducts 310, 320 and 330 are shown, it is contemplated that system 300 could include dual outlets, or four or more outlets depending upon the downstream components of the system.

Figure 4:
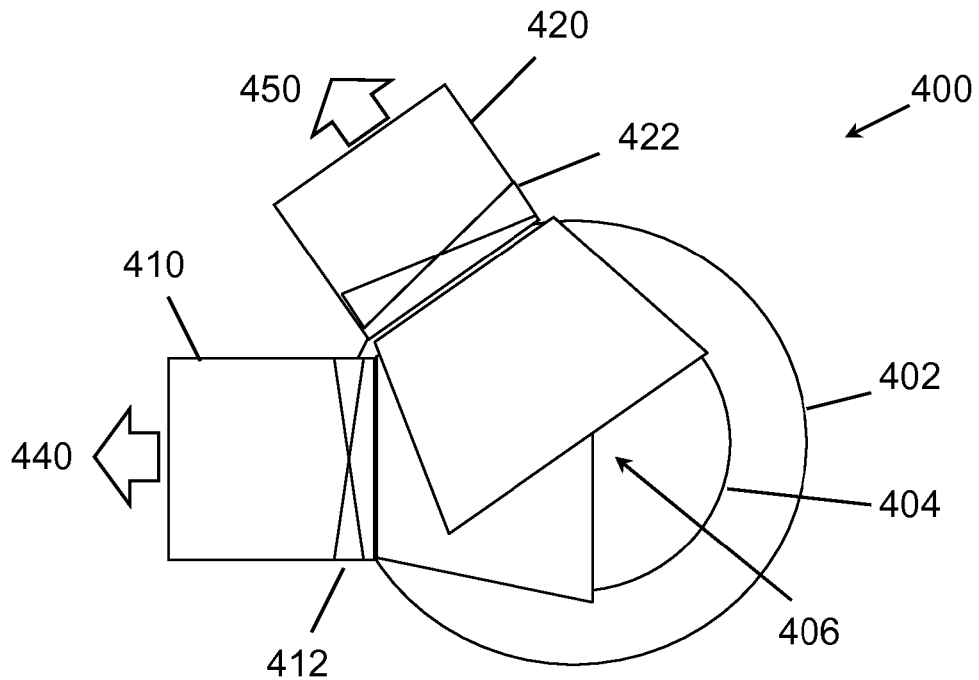

FIG. 4 illustrates another embodiment of a post-combustion conditioning system 400 that includes a bi-directional outlet hood 406 having first and second outlet ducts 410 and 420. Preferably, each of the first and second outlet ducts 410 and 420 is substantially supported by flue gas conditioning device 402. It should be noted that the hood 406 could have three or more outlets, and the angles of the outlets with respect to one another could be varied to fit the space or surrounding structure.

In some contemplated embodiments, a first portion of a conditioned stream can flow from the flue gas conditioning device 402 to a stack 440 via the first outlet duct 410. A second portion of the conditioned stream can flow through the second outlet duct 420 to a $CO_2$ capture device 450 or other commercially suitable gas conditioning device. With respect to the remaining numerals in FIG. 4, the same considerations for like components with like numerals of FIG. 3 apply.

Figure 5:
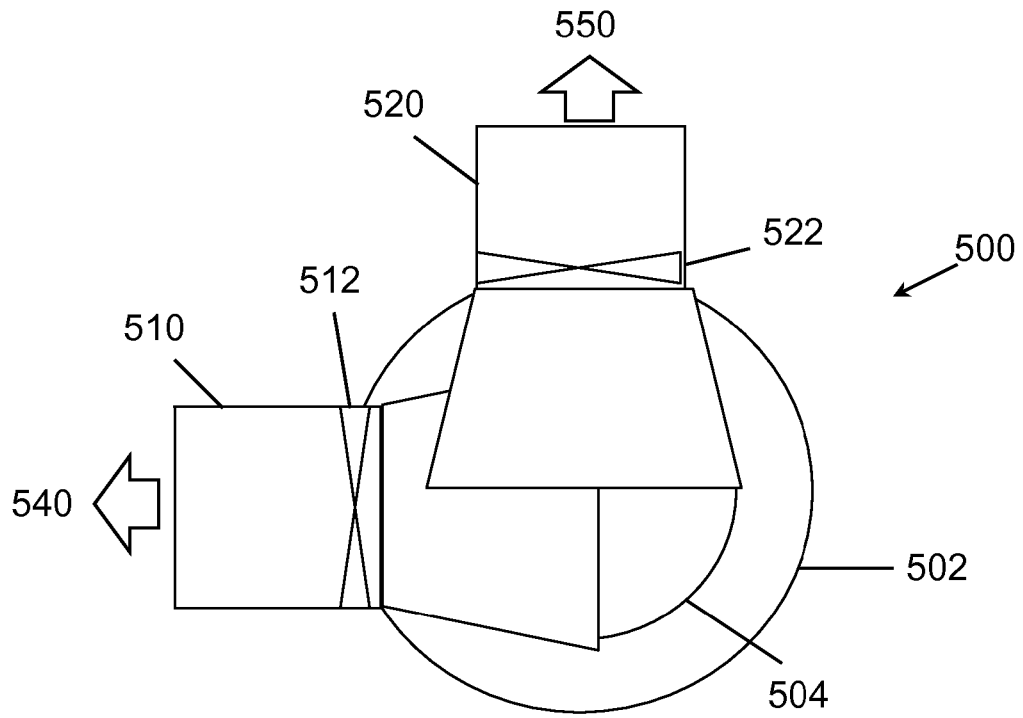

FIG. 5 illustrates yet another embodiment of a post-combustion conditioning system 500 that includes a bi-directional outlet hood 506 having first and second outlet ducts 510 and 520, which are arranged perpendicularly to each other. With respect to the remaining numerals in FIG. 5, the same considerations for like components with like numerals of FIG. 3 apply.

Figure 6:
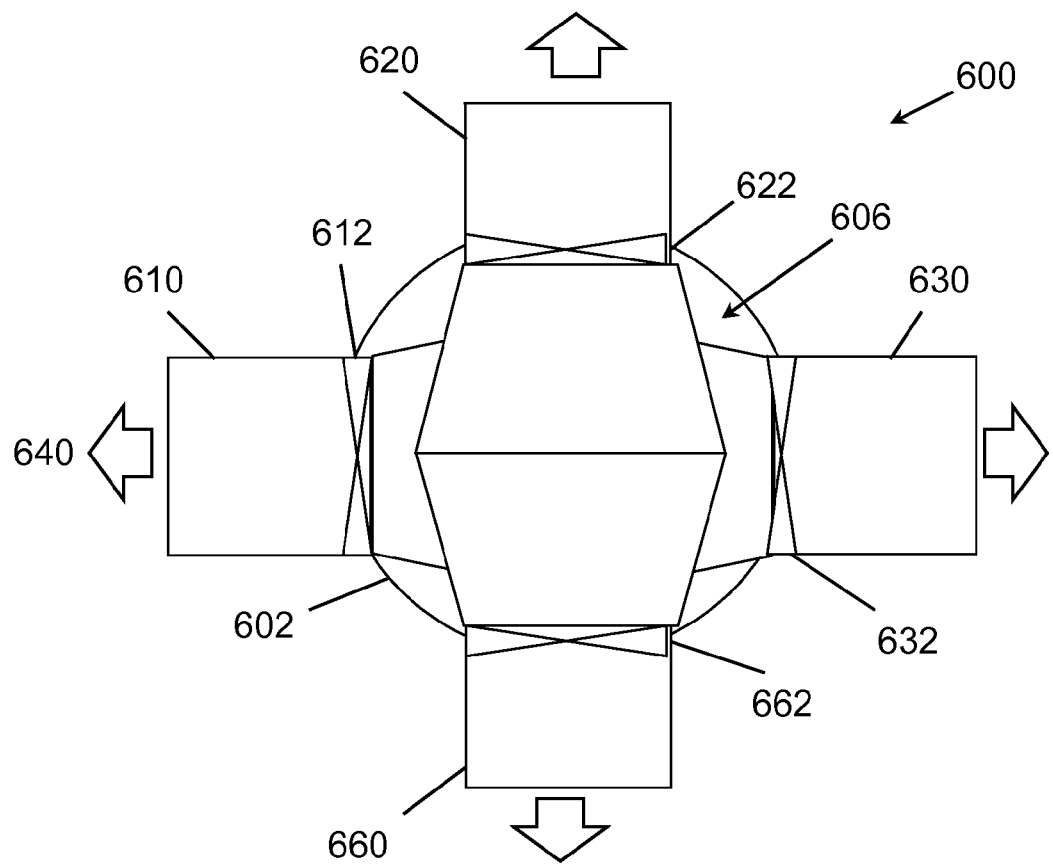

In FIG. 6, a post-combustion conditioning system 600 is shown having a multi-directional outlet hood 606 that includes four outlet ducts 610, 620, 630, and 660. Preferably, the outlet hood 606 and outlet ducts 610, 620, 630, and 660 are all substantially supported by a flue gas conditioning device 602, which eliminates the need for separate structural support.

At least one of the four outlet ducts 610, 620, 630, and 660 can couple the flue gas conditioning device 602 to a stack or chimney (not shown), through which a portion of a conditioned gas produced by the flue gas conditioning device 602 can exit the system 600. The flue gas conditioning device 602 can be further coupled to a second flue gas conditioning device (not shown) via at least one of the other outlet ducts 610, 620, 630, and 660. Each of the outlet ducts 610, 620, 630, and 660 can optionally include one or more dampers 612, 622, 632, and 662, respectively. With respect to the remaining numerals in FIG. 6, the same considerations for like components with like numerals of FIG. 3 apply.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A post-combustion conditioning system, comprising:
   a first flue gas conditioning device configured to condition an exhaust stream to produce a conditioned stream, wherein at least a portion of the conditioned stream exits though a top surface of the first flue gas conditioning device;
   first and second outlet ducts, each of which is fluidly coupled to the first flue gas conditioning device, wherein each of the first and second outlet ducts is substantially supported by the top surface of the first flue gas conditioning device; and
   wherein the first outlet duct is fluidly coupled to an exhaust duct, such that the conditioned stream can flow from the first conditioning device via the first outlet duct.

2. The system of claim 1, wherein the second outlet duct is fluidly coupled to a second flue gas conditioning device.

3. The system of claim 2, wherein the second flue gas conditioning device comprises a $CO_2$ capture device.

4. The system of claim 2, wherein the second flue gas conditioning device comprises a direct contact cooler.

5. The system of claim 2, wherein the second flue gas conditioning device comprises a flue gas desulfurization system.

6. The system of claim 1, wherein the first outlet duct is fluidly coupled to a stack such that the conditioned stream can flow from the first conditioning device to the stack via the first outlet duct.

7. The system of claim 1, wherein the first flue gas conditioning device comprises a direct contact cooler. a flue gas desulfurization system. or a caustic scrubber.

8. The system of claim 1, further comprising a damper coupled to the first outlet duct, and wherein the damper is substantially supported by the first flue gas conditioning device.

9. The system of claim 1, wherein the first outlet duct is configured to receive the conditioned stream.

10. The system of claim 1, wherein each of the first and second outlet ducts is configured to receive at least a portion of the conditioned stream.

11. The system of claim 1, further comprising a third outlet duct fluidly coupled to the first flue gas conditioning device, and wherein the third outlet duct is substantially supported by the first flue gas conditioning device.

12. The system of claim 11, wherein the third outlet duct is configured to receive at least a portion of the conditioned stream.

13. A post-combustion conditioning system, comprising:
    a first flue gas conditioning device configured to condition an exhaust stream to produce a conditioned stream;
    first and second outlet ducts, each of which is fluidly coupled to, and substantially supported by, the first flue gas conditioning device;
    wherein the first outlet duct is fluidly coupled to an exhaust duct, such that the conditioned stream can flow from the first conditioning device via the first outlet duct;
    a third outlet duct fluidly coupled to the first flue gas conditioning device, and wherein the third outlet duct is substantially supported by the first flue gas conditioning device; and
    wherein the third outlet duct fluidly couples the first flue gas conditioning device to a second flue gas conditioning device.

14. The system of claim 1, further comprising:
    an N outlet duct fluidly coupled to the first flue gas conditioning device, and that includes the first and second outlet ducts; and
    wherein the N outlet duct is substantially supported by the first flue gas conditioning device.

15. A post-combustion conditioning system, comprising:
    a first flue gas conditioning device configured to condition an exhaust stream to produce a conditioned stream;
    first and second outlet ducts, each of which is fluidly coupled to, and substantially supported by, the first flue gas conditioning device;
    wherein the first outlet duct is fluidly coupled to an exhaust duct, such that the conditioned stream can flow from the first conditioning device via the first outlet duct;
    an N outlet duct fluidly coupled to the first flue gas conditioning device, and that includes the first and second outlet ducts;
    wherein the N outlet duct is substantially supported by the first flue gas conditioning device; and
    wherein N is greater than three.

16. The system of claim 14, wherein the N outlet duct is configured to receive at least a portion of the conditioned stream.

17. The system of claim 14, wherein the N outlet duct fluidly couples the first flue gas conditioning device to a second flue gas conditioning device.

18. The system of claim 17, wherein N is greater than three.

19. The system of claim 1, further comprising a centering cone coupled to the top surface of the first flue gas conditioning device, and wherein the first and second outlet ducts are fluidly coupled to the first flue gas conditioning device via the centering cone.

20. The system of claim 1, wherein the first flue gas conditioning device supports at least 60% of a weight of each of the first and second outlet ducts.

* * * * *